US005855769A

United States Patent [19]

Firth et al.

[11] Patent Number: 5,855,769

[45] **Date of Patent: *Jan. 5, 1999**

[54] APPARATUS AND METHOD FOR SELECTIVE SEPARATION OF HYDROPHOBIC MATERIAL

[75] Inventors: Bruce Andrew Firth, Bellbowrie; Philip Kwadwo Ofori, Taringa, both of Australia

[73] Assignee: Commonwealth Scientific and Industrial Research Organisation, Campbell, Australia

[ * ] Notice: This patent issued on a continued prosecution application filed under 37 CFR 1.53(d), and is subject to the twenty year patent term provisions of 35 U.S.C. 154(a)(2).

[21] Appl. No.: 693,175

[22] PCT Filed: Feb. 14, 1995

[86] PCT No.: PCT/AU95/00064

§ 371 Date: Aug. 14, 1996

§ 102(e) Date: Aug. 14, 1996

[87] PCT Pub. No.: WO95/21698

PCT Pub. Date: Aug. 17, 1995

[30] Foreign Application Priority Data

Feb. 14, 1994 [AU] Australia ................................ PM3836

[51] Int. Cl.$^6$ ............................... B03D 1/24; B03D 1/02; C02F 1/24; B01D 17/035

[52] U.S. Cl. .......................... 209/164; 209/168; 209/170; 209/730; 209/732; 210/703; 210/704; 210/708; 210/788; 210/221.2; 210/512.1

[58] Field of Search .................................... 209/164, 166, 209/168, 169, 170, 730, 731, 732; 210/703, 704, 708, 788, 221.2, 512.1; 162/4

[56] References Cited

U.S. PATENT DOCUMENTS

| | | |
|---|---|---|
| 4,094,783 | 6/1978 | Jackson . |
| 4,214,982 | 7/1980 | Pfalzer . |
| 4,347,128 | 8/1982 | Barnscheidt . |
| 4,560,474 | 12/1985 | Holik . |
| 4,620,926 | 11/1986 | Linck . |
| 4,861,165 | 8/1989 | Fredriksson . |
| 4,952,308 | 8/1990 | Chamberlin . |
| 5,039,400 | 8/1991 | Kallioinen . |
| 5,096,572 | 3/1992 | Hwang . |
| 5,167,798 | 12/1992 | Yoon . |
| 5,340,467 | 8/1994 | Gregoli . |
| 5,512,133 | 4/1996 | Markham . |

FOREIGN PATENT DOCUMENTS

| | | |
|---|---|---|
| 198737 | 11/1988 | European Pat. Off. . |

*Primary Examiner*—Thomas M. Lithgow

*Attorney, Agent, or Firm*—Jacobson, Price, Holman & Stern, PLLC

[57] ABSTRACT

Hydrophobic material is selectively separated from an aqueous feed by forming gas bubbles in a flow of the feed, forming hydrophobic material/gas bubbles aggregates by motionless mixing and separating the aggregates as a froth by use of centrifugal action.

33 Claims, 4 Drawing Sheets

APPARATUS AND METHOD FOR SELECTIVE SEPARATION OF HYDROPHOBIC MATERIAL

TECHNICAL FIELD

The present invention relates to an apparatus and a method for the selective separation of hydrophobic material by froth flotation utilising centrifugal separation and to a centrifugal separator. The material which is selectively separated may be either hydrophobic per se or may be rendered hydrophobic or have its hydrophobicity enhanced by the use of appropriate reagent(s). The material may be separated from a suspension, slurry, emulsion or the like and includes material recovered in waste treatment processing (e.g. ink removal from paper during recycling processes) The material may be in the form of particulate material (eg. mineral or coal fines) or may be a liquid (eg. oil).

BACKGROUND ART

The recovery of mineral and coal fines presents considerable difficulties with the result that large losses of valuable resources are incurred in many operations. The separation of water contaminated with oil or other organic liquids is also difficult. Froth flotation is currently the most widely used method for fine particle processing but the cost of the flotation cells which are used is high. In a paper entitled "Study of Coal Flotation Practice—RD & D Requirement" published by BHP Central Research Laboratories in 1988, it was estimated that the base cell structure of mechanical flotation cells, including the rotor and stator accounts for almost 80% of the cost of a bank of cells, with the drive motors representing a further 6.5% of the cost. Accordingly, a significant reduction in the residence time (which dictates cell volume) would lead to a dramatic reduction in the capital costs of the cell and support structure.

Flotation is typically a process in which product particles in suspension are separated from reject particles on the basis of differences in their surface chemistry characteristics. The component to be floated is usually naturally hydrophobic or rendered hydrophobic by addition of suitable reagents. When air is introduced into the slurry system, the hydrophobic particles adhere to the air bubbles forming particle/bubble aggregates which rise to the surface of the flotation cell where they are removed as froth. Being hydrophilic, the remaining constituents of the slurry stay in suspension and are discharged as waste material which is generally referred to as tailings.

It has been identified that in the design of a flotation cell, four functions need to be accomplished, namely:

(i) transportation of hydrophobic material to a contacting zone, (ii) generation of bubbles, (iii) promotion of hydrophobic material-bubble collision in the contacting zone, and (iv) separation of hydrophobic material/bubble aggregates. In most flotation systems, particularly those which utilise mechanical agitation by impellers, the optimum levels of these four functions are not coincident. Additionally, the zone in which separation is performed is typically large due to slow transfer rates with the result that large process tanks are required.

Flotation has traditionally been carried out in mechanical flotation cells which are basically continuously stirred tank reactors in series. In these cells, particles are kept in suspension by impellers which also generate the bubbles and promote particle-bubble collision and attachment thus fulfilling the last three of the functions mentioned above. The turbulence which promotes particle bubble attachment also causes disruption of particle/bubble aggregates and mechanical entrainment of hydrophilic particles into the resultant froth. Additionally, the separation of the negatively buoyant hydrophobic particle/air bubble aggregates from the pulp containing the hydrophilic particles is driven by the force of gravity which makes it necessary for the slurry being processed to have a residence time within the flotation cell of the order of 3–5 minutes for coal and significantly longer for mineral applications. The design features of these cells therefore limit the overall efficiency of the flotation treatment of fine particles.

In recent years, the utilisation of countercurrent flotation columns to increase the efficiency of the flotation process has received significant attention. In these systems, air bubbles are generated continuously at the bottom of a column using spargers. The bubbles rise through the downwardly flowing slurry which is fed to the column at a position about two-thirds of the column height, resulting in bubble-particle collision and attachment. The grade of the product is further improved by washing the froth with water to minimise entrainment of hydrophilic particles. Several variations of the column have been designed, e.g. the Leeds Column, the Davcra cell, the Filblast column and the Microcel. The Microcel uses centrifugal pumps and inline mixers to generate micro-bubbles. While the grade is significantly improved by use of flotation columns, the yield or recovery may suffer and the capacity is relatively low due to the need for long residence times.

A more recent Australian development is referred to as the Jameson cell which is described in U.S. Pat. No. 4,938,865, AU 76108/91 and AU 83980/91. In this system, air is added to the slurry which is flowing down a long vertical tube. A flow restriction such as an orifice plate, promotes the formation of air bubbles which are intimately mixed with the particles before entering a tank or column where separation of froth and pulp occurs. The froth is removed from the top of the tank in the usual manner.

A number of new processes are being developed based on the concept of flotation in a centrifugal field.

An example of this type of technique is that referred to as the Air Sparged Hydrocyclone (ASH) which is described in U.S. Pat. No. 4,279,743, U.S. Pat. No. 4,397,741, U.S. Pat. No. 4,399,027 and U.S. Pat. No. 4,744,890. In this system, a prime feature is the use of a micro-porous material through which air is injected into a cylindrical cyclone. The porous material forms an inner tube in the cylindrical outer shell. Although the system has high, capacity, the cost of the micro-porous material makes the unit expensive as well as being subject to significant maintenance and wear problems. Additionally, differences in hydrostatic head leads to uneven dispersion of air bubbles.

Another system is that referred to as the Centrifloat Rapid Flotation System which is described in Brake IR, Graham JN, Madden RG and Drummond RB (1993) "Centrifloat Pilot Scale Trial at Goonyella Coal Preparation Plant", in Davies J. J. (ed), Proc. Sixth Australian Coal Preparation Conference, Paper G1, pages 364–400. This system uses a cyclone inlet to generate a swirl of the feed slurry which is introduced at the bottom of an open-top vessel. Air is injected upstream of the feed inlet via a cylindrical wall of a microporous material similar to that used in ASH. The froth migrates to the centre of the vessel and is collected at the top of a catchment basin. This dispersion of the air is unlikely to be efficient, reducing the probability of particle capture, particularly in situations where significant hydrostatic pressure variations exist.

A system described in AU 65432/90 also uses centrifugal action to enhance flotation. In this system the centrifugal action is mechanically generated. The cost of the system is adversely affected by the capital cost of the mechanism generating the centrifugal action, the power requirements and the maintenance of the moving parts.

Another system is that referred to as the Flotation Cyclone which is described in WO91/19572. This system utilises a flotation cylinder having a porous wall similar to ASH with the cylinder partitioned into upper and lower ends with a tangential inlet located adjacent the upper end.

A further system is described in U.S. Pat. No. 4,971,685 in which the flotation process has been partitioned into two discrete operations, namely bubble-particle contact and froth-pulp separation. A hydrocyclone with two entry ports, one for feed slurry and one for bubbles, acts as a bubble-particle contactor before discharging via a single exit at the apex of the cyclone into a shallow froth separation unit where the mineral laden froth is removed from the top. In this system the bubbles are generated externally and the centrifugal action is not utilised to enhance separation but merely for particle-bubble contact.

A further system is that referred to as the Fastflot process which uses high velocity clean liquid jets as air and energy carriers with the flotation separation taking place in a curved bottom tank.

DISCLOSURE OF THE INVENTION

In a first aspect, the present invention provides an apparatus for the selective separation of hydrophobic material from an aqueous feed, the apparatus comprising:

(a) flow inducing means for providing a flow of the feed;

(b) gas introduction means for introducing a gas and forming bubbles of the gas in the flow;

(c) motionless mixing means for dispersing the gas bubbles in the flow and causing contact between the hydrophobic material and the gas bubbles; and (d) centrifugal separation means in fluid communication with the motionless mixing means for separating, from the flow as froth, hydrophobic material/gas bubble aggregates formed by contact between the hydrophobic material and the gas bubbles.

In a second aspect, the present invention provides a method for the selective separation of hydrophobic material from an aqueous feed, the method comprising the steps of:

(a) providing a flow of the feed;

(b) introducing a gas into the flow whereby the flow contains bubbles of the gas;

(c) subjecting the flow containing gas bubbles to motionless mixing to disperse the gas bubbles in the flow and cause contact between the hydrophobic material and the gas bubbles, whereby hydrophobic material/gas bubble aggregates are formed in the flow; and (d) introducing the aggregates containing flow into centrifugal separation means whereby aggregates are separated from the flow as froth.

It will be appreciated that in the aforementioned apparatus and method of the present invention, the sub-processes of the flotation process (transportation of hydrophobic material, bubble generation, hydrophobic material-bubble collision and attachment, and froth separation) have been separated into discrete unit operations so that they may be independently optimised.

The aforementioned apparatus and method of the present invention are applicable to all materials in which the component to be separated is naturally hydrophobic or can be made hydrophobic relative to other components in the aqueous feed by addition of appropriate reagent(s) which are referred to as collectors by those of skill in the art.

Where use of a collector is required, the collector will be typically introduced between the source of the feed and the gas introduction means. Further, it is preferred that the collector is dispersed in the flow by mixing such as by use of one or a series of inline mixers upstream of the gas introduction means. Depending upon the nature of the feed and the hydrophobic material, it may also be desirable to introduce other reagents such as frothers, promoters and depressants and again it is generally preferred to introduce such reagents between the source of the feed and the gas introduction means using motionless mixing to disperse the reagents in the flow; however, some reagents may be added directly to the source of the feed.

The source of the feed will typically be a vessel and depending upon the nature of the feed and the hydrophobic material, the feed may be agitated in the vessel by an impellor or the like. The flow of the feed may be provided by various means including a sufficient head in a feed vessel or by a pump. Preferably, the flow of the feed is provided by a single or variable speed centrifugal pump. Preferably, a flow transducer is located immediately downstream of the pump to determine the flow rate and density of the feed which are utilised to control the addition of reagents. Where reagents are added directly to the source of the feed, flow measurement is not critical.

Various gases may be introduced into the flow but the gas is preferably air. The gas introduction means may be any suitable means for supplying gas to the flow but is preferably an orifice plate or, more preferably, a jet mixer eductor which preferably has a Bernouilli-type nozzle. Where a jet mixer eductor is used, low pressure gas may be introduced or educted at the low pressure side of the nozzle to be broken up into bubbles by the energy of the flow or gas bubbles may be externally generated by a bubble generator and introduced at the jet mixer eductor. The former has the advantages of being less expensive, simpler and more reliable; whereas, the latter allows for greater control of bubble size. In either case a plurality of inlets to a jet mixer eductor may be used. The bubble generator may be an ultrasonic whistle, porous plug, a laser-cut screen bubble generator or the like. Where an external bubble generator is used, it is preferred to introduce any frother at the bubble generator rather than between the source of the feed and the gas introduction means. A series of orifice plates and/or jet mixer eductors may be used.

Aggregates of the hydrophobic material and bubbles are primarily formed by subjecting the flow to motionless mixing by motionless mixing means such as inline mixers. A series of inline mixers may be used and the mixing elements of the inline mixer(s) may be arranged to provide a laminar or turbulent flow field. Additional aggregates may be formed downstream of the motionless mixing means in the centrifugal separation means.

In the present invention, centrifugal action is superimposed on the separation process in the centrifugal separation means to improve kinetics and efficiency. The actions of centrifugal force and surface forces produce sharp hydrophobic/hydrophilic material separation. The centrifugal action may be generated by the use of a conventional cyclone header in which the flow containing the hydrophobic material/bubble aggregates enters the cyclone at a tangent or in involute fashion. Preferably however the centrifugal separation means is a centrifugal separator in accordance with the present invention.

In a third aspect, the present invention provides a separator for centrifugally separating hydrophobic material/gas bubble aggregates from a flow containing the aggregates, the separator comprising:

(a) a generally vertically orientated cylindrical vessel;

(b) inlet means located in a wall of the vessel for introducing the flow into the vessel whereby a downwardly spiralling flow is formed within the vessel with consequential separation of aggregates as a rising froth and waste material;

(c) first outlet means located below the inlet means for removal of waste material from the vessel;

(d) second outlet means located above the inlet means for removal of froth from the vessel; and (e) a generally horizontally orientated partition which spans the walls of the vessel and which is located between the inlet means and the second outlet means dividing the vessel into an upper portion and a lower portion, the partition having means for permitting the upwardly moving passage of froth through the partition and means for permitting the downwardly moving passage of waste material through the partition.

Preferably the inlet means comprises a tangential or involute entry port located partway up the wall, preferably in the mid-section, of the vessel. Preferably, the outlet means comprises a tangential outlet port located at or about a closed bottom of the vessel. Preferably the separator further comprises means for controlling the level of material in the vessel, such as a valve located on the outlet port.

Optionally a froth stabiliser may be installed in the lower portion of the vessel to keep the froth stable and prevent by-passing of bubbles to the first outlet means.

The partition is preferably a plate and the means or permitting upwardly moving passage of froth is preferably a generally centrally disposed aperture formed in the plate. The aperture is preferably circular. The means for permitting downwardly moving passage of waste material is preferably a plurality of apertures formed in the plate between the centrally disposed aperture and the walls of the vessel. More preferably, the plurality of apertures surround the centrally disposed aperture in a concentric fashion. The centrally disposed aperture allows the froth of hydrophobic material/bubble aggregates to move into the upper portion of the vessel while the plurality of apertures allows waste material, such as water and hydrophilic material entrained in the froth, to drain into the lower portion of the vessel.

Preferably, the separator further comprises enrichment means located in the upper portion of the vessel for enriching the froth by removal of waste material entrained in the froth. The enrichment means preferably comprises one or more baffles which create a calming zone in the upper portion of the vessel by exertion of backpressure on the froth. This backpressure results in a froth crowding effect whereby drainage of entrained waste material occurs. More preferably, the enrichment means comprises a plurality of generally vertically orientated ribs which extend from the inside of the walls of the vessel towards the centre of the vessel in the upper portion of the vessel.

Optionally the separator may further comprise washing means for further enrichment of the hydrophobic component of the froth in which the froth is washed with clean water.

Preferably, the second outlet means comprises a product launder located in the upper portion of the vessel into which the hydrophobic material-rich froth flows for collection. Paddles may be used for moving the froth into the launder.

The separation of the sub-processes of the flotation process in the present invention allows for optimisation of separation. For example, a plurality of centrifugal separation means may be used in parallel; all being fed from a common header. Alternatively or additionally, a plurality of centrifugal separation means may be used in series with the waste material from the first in the series being further processed to form further hydrophobic material/bubble aggregates which are separated in a second in the series.

As in ASH, the advantages of centrifugal separation, namely simplicity, economy and high capacity are integral in the present invention but unlike ASH, the maintenance complication and high cost of the porous material are eliminated. Preferred embodiments of the present invention require a residence times of the order of seconds, as compared with 5–10 minutes for conventional technology and hence provide a much higher capacity per unit cell volume than is the case for conventional flotation technology.

BRIEF DESCRIPTION OF DRAWINGS

The present invention will now be described by way of example only with reference to the accompanying drawings, in which.

BEST MODE FOR CARRYING OUT THE INVENTION

Figure 1:
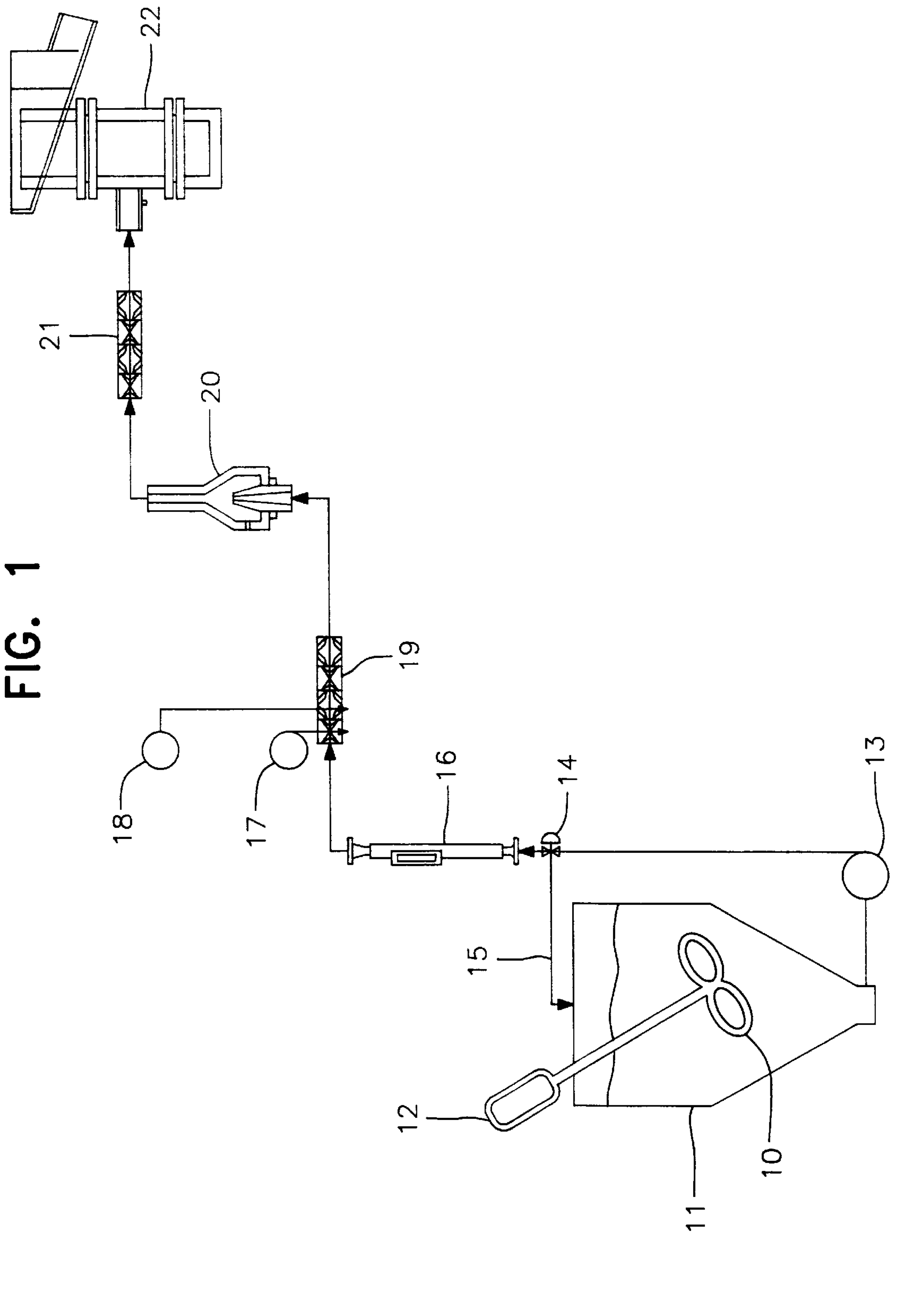
FIG. 1 is a partially schematic flow diagram of an embodiment of the present invention for the selective separation of coal fines.

Referring firstly to FIG. 1 an aqueous feed comprising a slurry 10 containing coal fines is contained within vessel 11 and can be agitated by variable speed mixer 12. A flow of the slurry 10 is provided by flow inducing means in the form of variable speed centrifugal pump 13 which pumps the slurry through valve 14 which allows for recirculation into the vessel 10 via line 15. A mass flow transducer 16 provides an output to a mass flow computer (not shown) which in turn provides measures of the mass flow rate and density of the slurry. This data is used in the control of reciprocating reagent pumps 17 and 18 which introduce a collector (diesel oil) and a frother (4-methyl-2-pentanol (methyl-isobutyl carbinol)) (MIBC) respectively into motionless mixing means in the form of two inline mixers 19 in series (one only illustrated) which disperse the reagents in the slurry.

The slurry conditioned with reagents then passes through gas introduction means in the form of a vertically orientated jet mixer eductor (Bernouilli-type nozzle) 20 where low pressure air is introduced at the low pressure side of the nozzle through three inlets separated by 120° with the air being broken up into bubbles by the energy of the flowing conditioned slurry. The slurry containing bubbles then passes through motionless mixing means in the form of two inline mixers 21 in series (one only shown) which enhances dispersion of the bubbles in the slurry and causes contact between the coal fines and the bubbles. The slurry containing coal fines/bubble aggregates then enter centrifugal separation means in the form of a centrifugal separator 22 which is described in relation to FIGS. 3, 4 and 5.

Figure 2:
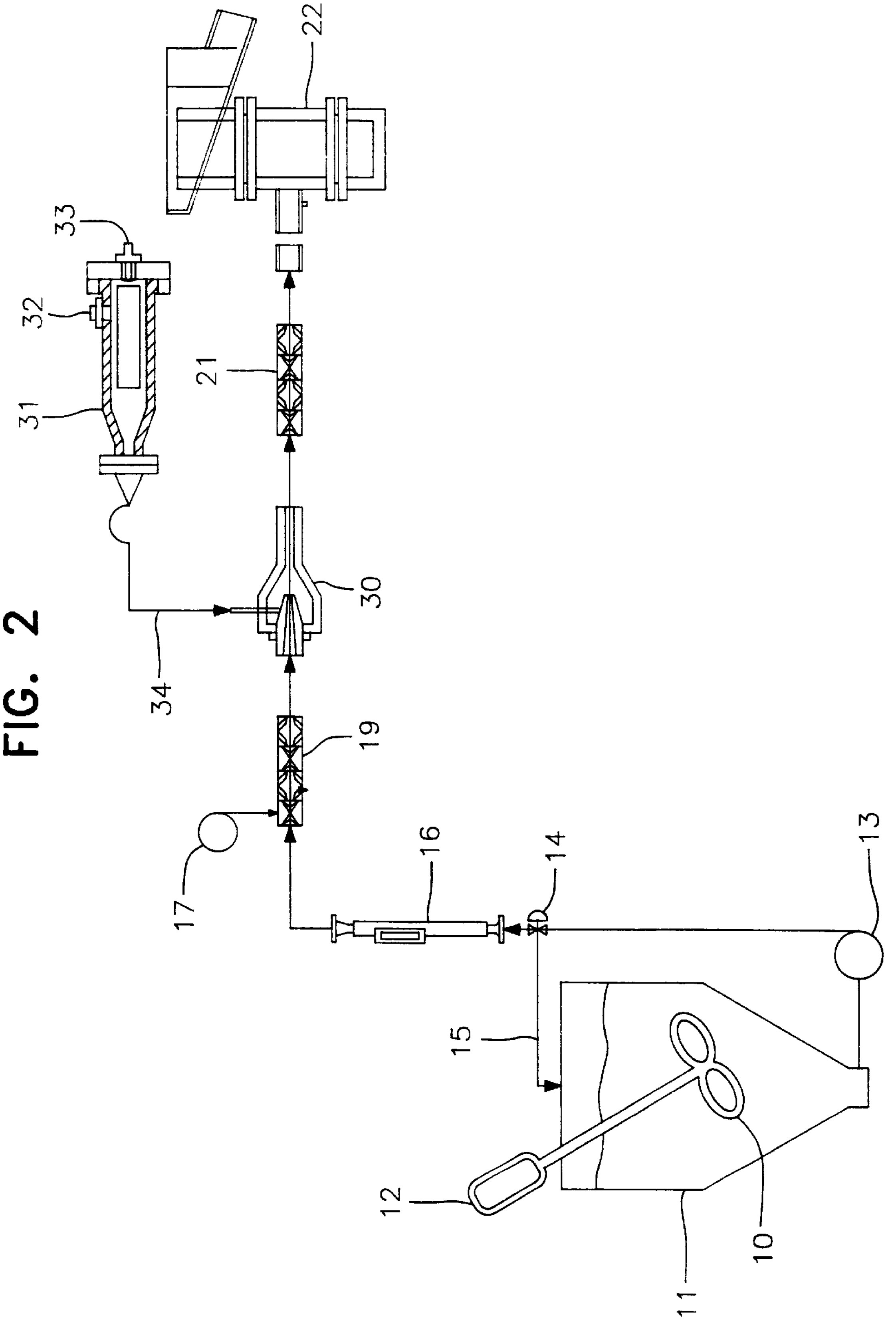
FIG. 2 is a partially schematic flow diagram of an alternative embodiment of the present invention for the selective separation of coal fines.

To avoid repetition, in FIG. 2 like numerals have been utilised to designate like elements in FIG. 1. The embodiments of FIGS. 1 and 2 differ in relation to the gas introduction means and, consequently the introduction of frother. Referring now to FIG. 2, the slurry conditioned with collector passes through gas introduction means in the form of a horizontally orientated jet mixer eductor 30 and external bubble generator 31. Water and frother are introduced into bubble generator 31 via inlet 32 with air introduced via inlet 33. Air bubbles produced by bubble generator 31 are introduced into eductor 30 via line 34.

Figure 4:
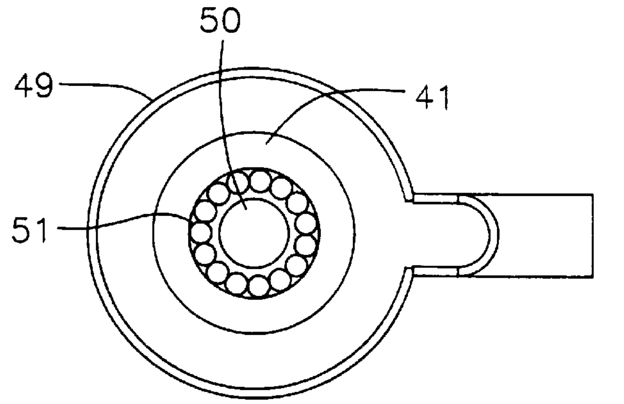
FIG. 4 is a plan view of the separator illustrated in FIG. 3.
Figure 3:
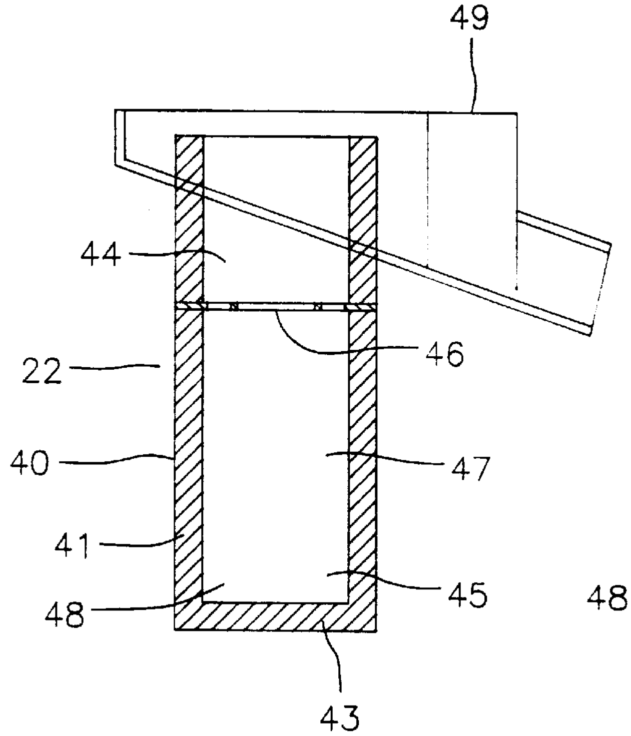
FIG. 3 is a partially schematic vertical cross-section of a centrifugal separator according to the present invention.
Figure 5:
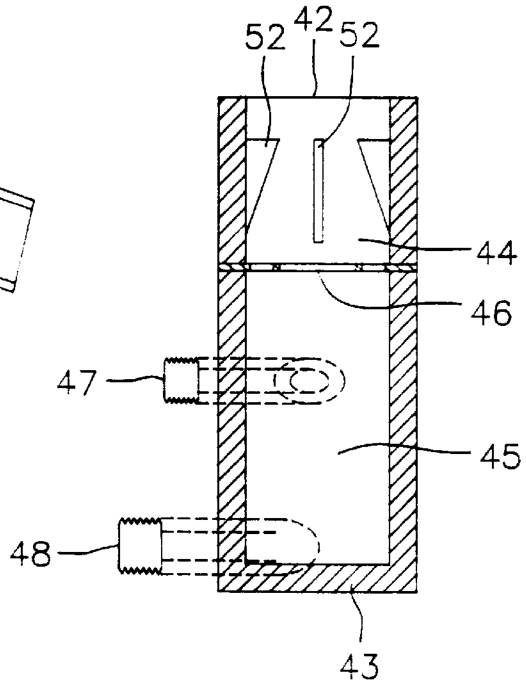
FIG. 5 is a partially schematic vertical cross-section of the separator illustrated in FIG. 3 rotated through 90°.

Referring now to FIGS. 3, 4 and 5 the separator 22 comprises a vertically oriented cylindrical vessel 40 having walls 41, an open top 42 and a closed bottom 43. The vessel 40 is divided into an upper portion 44 and a lower portion 45 by a horizontally orientated partition in the form of plate 46. Inlet means and first outlet means in the form of tangential entry port 47 and tangential outlet port 48 respectively are located in the lower portion 45. Second outlet means in the form of launder 49 sits atop the vessel 40 with the launder 49 having been omitted from FIG. 5 for reasons of clarity. Plate 46 spans the walls 41 and is formed with a relatively large centrally disposed circular aperture 50 which is concentrically surrounded by a plurality of smaller apertures 51. Enrichment means in the form of a plurality of vertically orientated ribs 52 extend from the inside of the walls 41 towards the centre of the vessel 40. The ribs 52 taper from top to bottom to assume a triangular shape and have been omitted from FIGS. 3 and 4 for reasons of clarity.

The coal fines-bubble contacting is largely achieved in the in-line mixers 21 prior to entering the centrifugal separator 22. The tangential orientation of the inlet port 47 causes the injected particulate suspension to form a downwardly spiralling flow within the lower portion 45 of the vessel 40 such that the spiralling flow generates a centrifugal force field. The negatively buoyant coal fines/bubble aggregates quickly migrate to the centre of the vessel 40 and pass up through aperture 50 of the plate 46 as a froth with water and hydrophilic material remaining in the lower portion 45. In the upper portion 44 of the vessel the froth encounters ribs 52 which create a calming region near the top of the vessel 40 and cause a crowding effect on the froth which promotes drainage of water and entrained hydrophilic material from the froth through apertures 51 into the lower portion 45 of the vessel 40.

The hydrophilic material and the water discharge from vessel 40 via tangential outlet port Importantly, the tangential nature of the outlet port 48 minimises the discharge of fine bubbles carrying coal fines because it is difficult for the negatively buoyant coal fines/bubble aggregates to approach the walls 41 of the vessel 40.

EXAMPLE

The ensuing example is illustrative of a preferred embodiment of the present invention and was performed using apparatus as described in relation to FIG. 1, 3, 4 and 5.

The hydrophobic material was coal having a fineness of 100% passing 500 microns and an ash content of 23%. A slurry containing 5–10% by weight coal was prepared and pumped at a slurry feed rate of 8 to 16 liters per minute which represented a mean residue time in the centrifugal separator of 5–10 seconds with the separator having a volume of 1.38 liters. Diesel oil collector was added to the slurry in-line at 800–1000 g per tonne of coal followed by the in-line addition of 20–30 ppm of MIBC frother. The collector and frother were dispersed in the slurry by in-line mixers after which 8–20 liters per minute of air were introduced to the slurry. The air bubbles and coal particles were vigorously mixed by in-line mixers before entry to the separator.

Tree flotation analysis was conducted, together with a laboratory flotation test (Australian Standard Laboratory Test AS2579.1-1983) for comparison purposes. Results of the tree flotation analysis, the standard test and the example of the present invention are set out in FIG. 6.

The tree flotation analysis curve represent a yardstick measurement against which flotation performance of any system may be compared. In general, the proximity of the yield/ash result of any system to the tree flotation curve is a simple measurement of flotation efficiency. The maximum separation efficiency defined as the difference between the combustibles recovery and the ash recovery occurs at the elbow of the yield ash curve.

Figure 6:
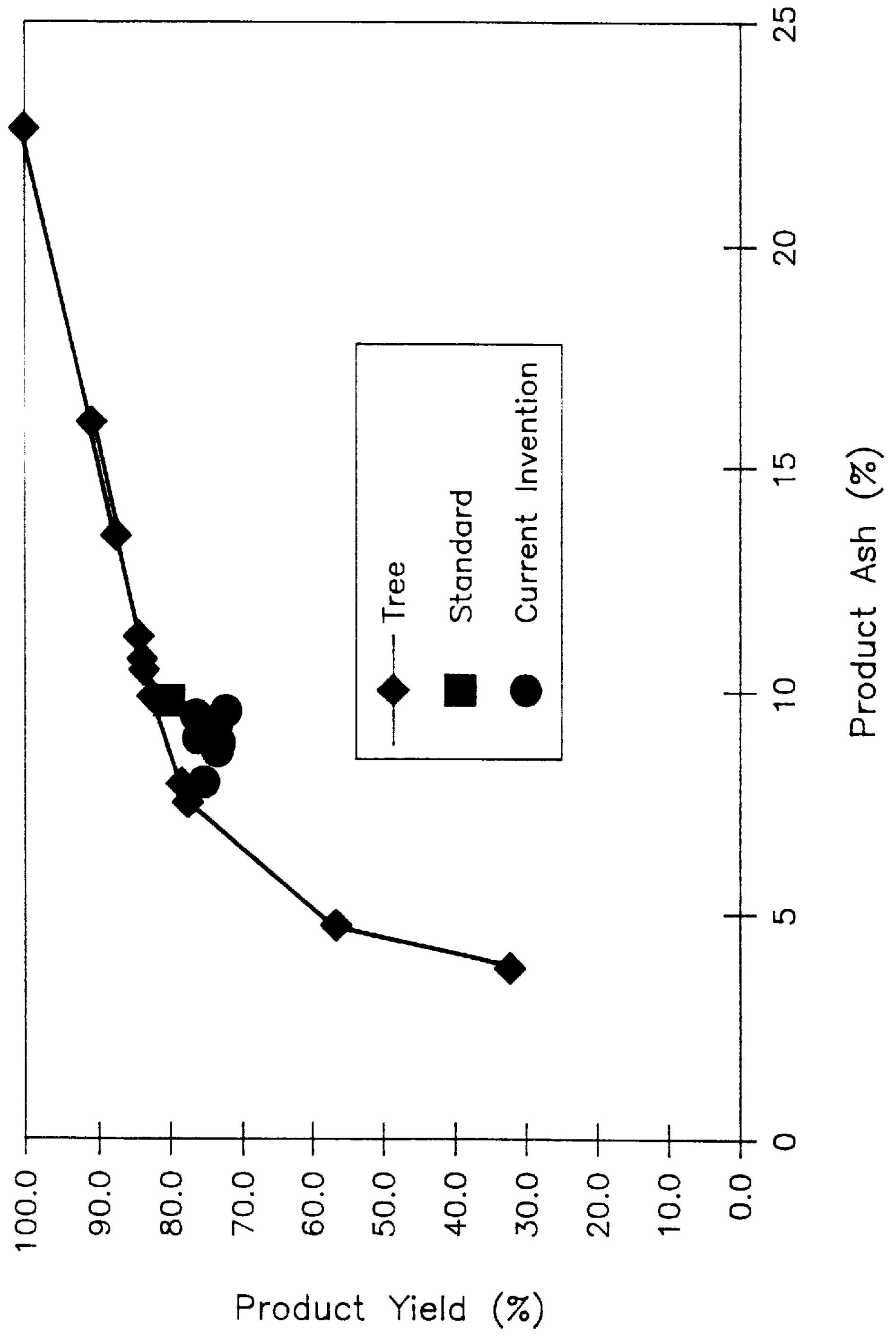
FIG. 6 is a plot subsequently referred to in relation to an example which is illustrative of a preferred embodiment of the present invention.

As can be seen from FIG. 6 very high performances were achieved in very short periods of time in the example of the present invention. The proximity of the results of the example of the present invention to the elbow of the yield/ash curve of the tree analysis indicates very effective flotation separation. The product yield and ash of the example of the present invention are comparable to that achieved with the standard test but in a period of time 15–30 times less than according to the standard test.

We claim:

1. A separator for centrifugally separating hydrophobic material/gas bubble aggregates from a flow containing the aggregates, the separator comprising:

(a) a generally vertically orientated cylindrical vessel;

(b) inlet means located in a wall of the vessel for introducing the flow into the vessel as a downwardly spiralling flow within the vessel with consequential separation of aggregates as a rising froth and waste material;

(c) first outlet means located below the inlet means for removal of waste material from the vessel;

(d) second outlet means located above the inlet means for removal of froth from the vessel; and (e) a generally horizontally orientated partition which spans the walls of the vessel and which is located between the inlet means and the second outlet means dividing the vessel into an upper portion and a lower portion, the partition having means for permitting the upwardly moving passage of froth through the partition and means for permitting the downwardly moving passage of waste material through the partition.

2. A separator as claimed in claim 1 wherein the inlet means comprises a tangential or involute entry port.

3. A separator as claimed in claim 1 wherein the first outlet means comprises a tangential outlet port located at or about a closed bottom of the vessel.

4. A separator as claimed in claim 3 further comprising a valve located on the outlet port for controlling the level of material in the vessel.

5. A separator as claimed in claim 1 wherein the partition is a plate, the means for permitting upwardly moving passage of froth is a generally centrally disposed circular aperture formed in the plate, and the means for permitting downwardly moving passage of waste material is a plurality of circular apertures formed in the plate in concentric fashion around the centrally disposed circular aperture.

6. A separator as claimed in claim 1 further comprising enrichment means located in the upper portion of the vessel for enriching the froth by removal of waste material contained in the froth.

7. A separator as claimed in claim 6 wherein the enrichment means comprises one or more baffles.

8. A separator as claimed in claim 6 wherein the enrichment means comprises a plurality of generally vertically orientated ribs which extend from the inside of the walls of the vessel towards the centre of the vessel.

9. A separator as claimed in claim 1 further comprising washing means for washing the froth with water.

10. A separator as claimed in claim 1 wherein the second outlet means comprises a product launder located in an upper portion of the vessel.

11. A method for the selective separation of hydrophobic material from an aqueous feed, the method comprising the steps of:

(a) providing a flow of the aqueous feed through a conduit means;

(b) introducing a gas into the flow and forming bubbles of the gas in the flow as the flow moves through the conduit means;

(c) subjecting the flow containing gas bubbles to motionless mixing to disperse the gas bubbles in the flow and cause contact between the hydrophobic material and the gas bubbles, whereby hydrophobic material/gas bubble aggregates are formed in the flow; and (d) introducing the aggregates containing flow into centrifugal separation means whereby aggregates are separated from the flow as froth, the centrifugal separation means comprising a generally vertically orientated cylindrical vessel, inlet means located in a wall of the vessel for introducing the flow into the vessel as a downwardly spiraling flow within the vessel with consequential separation of aggregates as a rising froth and waste material, first outlet means located below the inlet means for removal of waste material fro the vessel, second outlet means located above the inlet means for removal of froth from the vessel, and a generally horizontally orientated partition which spans the walls of the vessel and which is located between the inlet means and the second outlet means dividing the vessel into an upper portion and a lower portion, the partition having means for permitting the upwardly moving passage of froth through the partition and means for permitting the downwardly moving passage of waste material through the partition.

12. A method as claimed in claim 11 wherein the hydrophobic material is coal fines, mineral fines, oil, or material for recovery from waste treatment processing.

13. A method as claimed in claim 11 wherein the gas is air.

14. A method as claimed in claim 11 wherein bubbles of the gas are formed in the flow as the flow moves through a substantially vertically oriented portion of the conduit means.

15. An apparatus for the selective separation of hydrophobic material from an aqueous feed, the apparatus comprising:

(a) flow inducing means for providing a flow of the aqueous feed through a conduit means;

(b) gas introduction means for introducing a gas and forming bubbles of the gas in the flow as the flow moves through the conduit means;

(c) motionless mixing means in fluid communication with the conduit means for dispersing the gas bubbles in the flow and causing contact between the hydrophobic material and the gas bubbles; and (d) centrifugal separation means in fluid communication with the motionless mixing means for separating, from the flow as froth, hydrophobic material/gas bubble aggregates formed by contact between the hydrophobic material and the gas bubbles, the centrifugal separation means comprising a generally vertically orientated cylindrical vessel, inlet means located in a wall of the vessel for introducing the flow into the vessel as a downwardly spiraling flow within the vessel with consequential separation of aggregates as a rising froth and waste material, first outlet means located below the inlet means for removal of waste material from the vessel, second outlet means located above the inlet means for removal of froth from the vessel, and a generally horizontally orientated partition which spans the walls of the vessel and which is located between the inlet means and the second outlet means dividing the vessel into an upper portion and a lower portion, the partition having means for permitting the upwardly moving passage of froth through the partition and means for permitting the downwardly moving passage of waste material through the partition.

16. An apparatus as claimed in claim 15 wherein the inlet means comprises a tangential or involute entry port.

17. An apparatus as claimed in claim 15 wherein the first outlet means comprises a tangential outlet port located at or about a closed bottom of the vessel.

18. An apparatus as claimed in claim 17 further comprising a valve located on the outlet port for controlling the level of material in the vessel.

19. An apparatus as claimed in claim 15 wherein the partition is a plate, the means for permitting upwardly moving passage of froth is a generally centrally disposed circular aperture formed in the plate, and the means for permitting downwardly moving passage of waste material is a plurality of circular apertures formed in the plate in concentric fashion around the centrally disposed circular aperture.

20. An apparatus as claimed in claim 15 further comprising enrichment means located in the upper portion of the vessel for enriching the froth by removal of waste material contained in the froth.

21. An apparatus as claimed in claim 20 wherein the enrichment means comprises one or more baffles.

22. An apparatus as claimed in claim 20 wherein the enrichment means comprises a plurality of generally vertically orientated ribs which extend from the inside of the walls of the vessel towards the center of the vessel.

23. An apparatus as claimed in claim 15 further comprising washing means for washing the froth with water.

24. An apparatus as claimed in claim 15 wherein the second outlet means comprises a product launder located in an upper portion of the vessel.

25. An apparatus as claimed in claim 15 wherein the gas introduction means is arranged such that bubbles of the gas are formed in the flow as the flow moves through a substantially vertically orientated portion of the conduit means.

26. An apparatus as claimed in claim 15 further comprising reagent introduction means for introducing reagents into the flow upstream of the gas introduction means.

27. An apparatus as claimed in claim 26 further comprising second motionless mixing means for dispersing reagents in the flow upstream of the reagent introduction means.

28. An apparatus as claimed in claim 15 wherein the flow inducing means comprises a pump.

29. An apparatus as claimed in claim 28 wherein the pump is a single or variable speed centrifugal pump.

30. An apparatus as claimed in claim 15 wherein the gas introduction means comprises a jet mixer eductor having a Bernouilli-type nozzle or series of such jet mixer eductors.

31. An apparatus as claimed in claim 30 arranged for introduction or eduction of gas at the low pressure side of the nozzle of each jet mixer eductor.

32. An apparatus as claimed in claim 30 wherein the gas introduction means further comprises a bubble generator arranged to supply gas bubbles to the jet mixer eductors.

33. An apparatus as claimed in claim 15 wherein the motionless mixing means comprises an inline mixer or a series of inline mixers.

* * * * *